April 22, 1958 R. L. GARWIN ET AL 2,832,061
SPIN ECHO TECHNIQUE AND APPARATUS
Filed Feb. 10, 1955 3 Sheets-Sheet 1
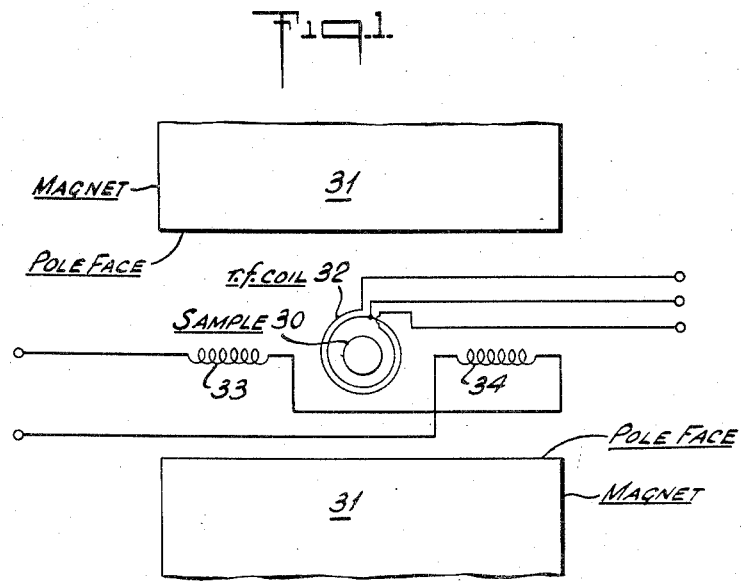
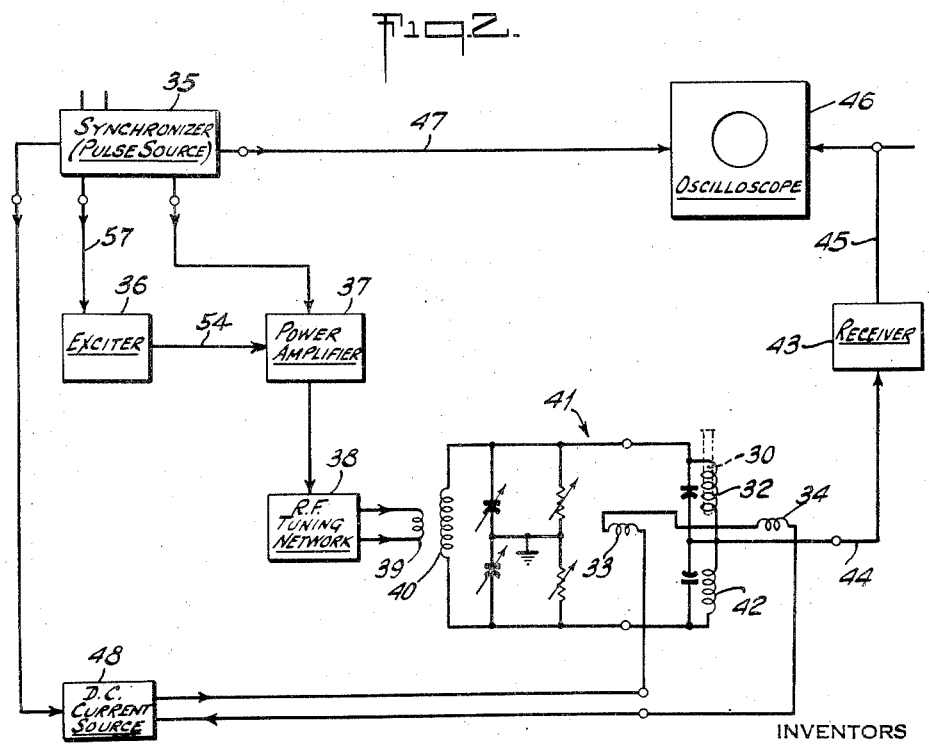
INVENTORS
RICHARD L. GARWIN
ROBERT M. WALKER
BY
Van Deventer & Shively
ATTORNEYS April 22, 1958  R. L. GARWIN ET AL  2,832,061
SPIN ECHO TECHNIQUE AND APPARATUS
Filed Feb. 10, 1955  3 Sheets-Sheet 2
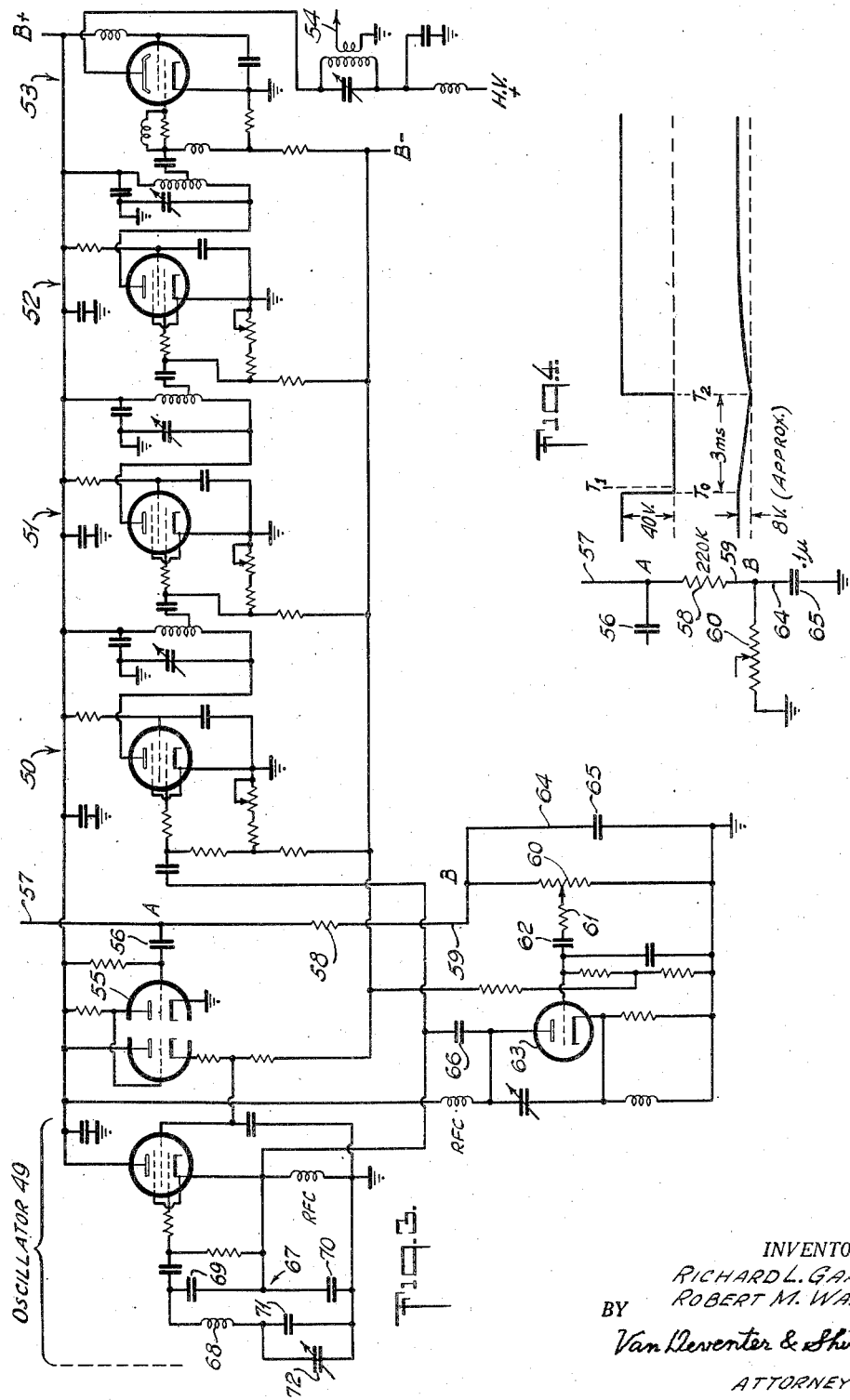
INVENTORS
RICHARD L. GARWIN
ROBERT M. WALKER
BY
Van Deventer & Shively
ATTORNEYS

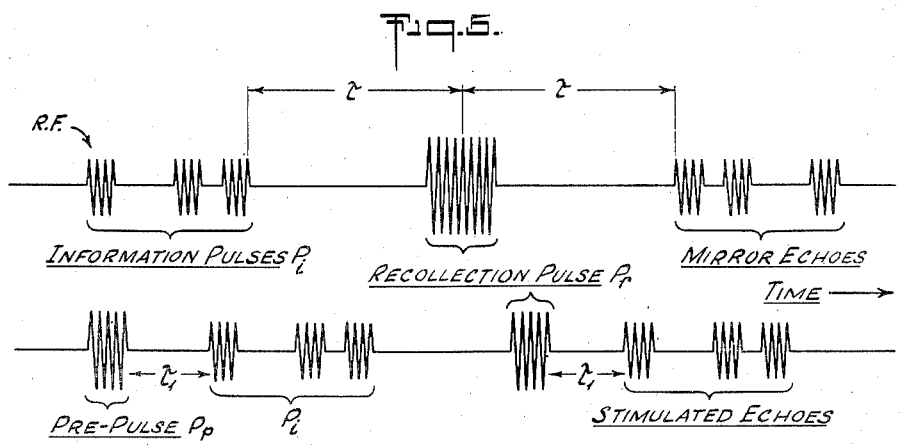
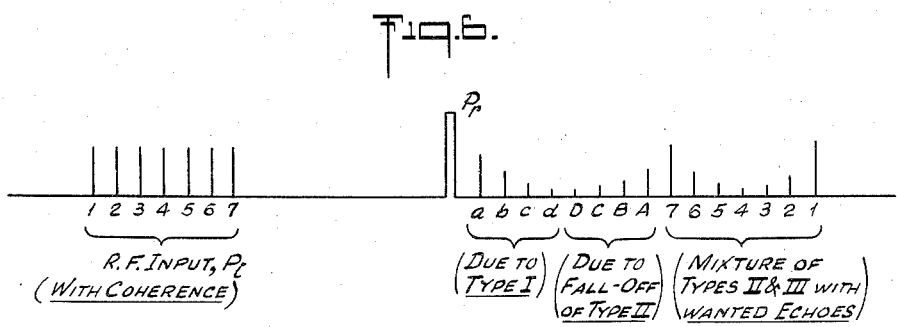
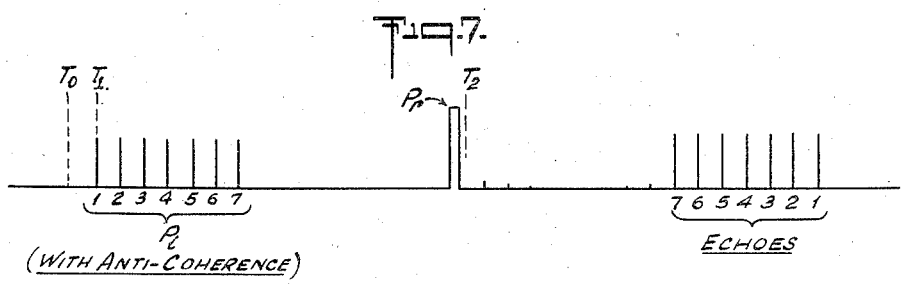
INVENTORS
RICHARD L. GARWIN
ROBERT M. WALKER
BY
Van Deventer & Shively
ATTORNEYS.

United States Patent Office 2,832,061
Patented Apr. 22, 1958

2,832,061

SPIN ECHO TECHNIQUE AND APPARATUS

Richard L. Garwin, New York, N. Y., and Robert M. Walker, Closter, N. J., assignors to International Business Machines Corporation, a corporation of New York Application February 10, 1955, Serial No. 487,378

7 Claims. (Cl. 340—173)

The present invention pertains to improvements in spin echo technique and apparatus.

The principal object of the invention is to provide a method of employing anti-coherence in the signalling frequency of a spin echo information storage process to inhibit spurious echo interference with desired output signals.

A further object is to provide a method of the above nature employing displaced relative R. F. phase relationships among entry pulses and incipient inter-pulse echo effects to establish the desired anti-coherence.

A further object is to provide suitable means to carry out the above methods.

Spin-echo technique in general comprises a method of storing information in the form of electrical pulses applied to samples of suitable chemical materials, and subsequently recovering the information as "echo" pulses produced by free nuclear induction.

The phenomenon of free nuclear induction per se has been set forth in Patent No. 2,561,489 to F. Bloch et al., as well as in various well-known scientific publications by Bloch and by Purcell. The extension of the effect to produce spin echoes, the work of E. L. Hahn, was described by the latter scientist in an article entitled "Spin Echoes," published in Physical Review, November 15, 1950. Since the above publications are readily available in the public domain, repetition herein of the entire complex mathematical analysis contained in them is unnecessary. However, in order to set forth most clearly the nature and advantages of the present invention, it is appropriate first to describe briefly the pertinent general principles of spin echo technique. In this explanation, and the succeeding exposition of the present invention, reference is made to the accompanying drawings, in which:

Figures 1 and 2 are joint diagrammatic illustrations of suitable apparatus for producing spin echoes;

Figure 3 is an electrical diagram of means to produce phase anti-coherence according to the present invention;

Figure 4 illustrates typical control wave forms utilized in the apparatus of Figure 3;

Figure 5 is a double time-sequence graph illustrating the distinction between mirror echo and stimulated echo effects;

Figure 6 is a time diagram showing the effect of inter-pulse echoes in a phase coherent mirror echo system, and Figure 7 is a similar diagram illustrating the same type of process operated with the phase anti-coherent method of the present invention.

Nuclear induction, while in itself a magnetic function, is based on a combination of magnetic and mechanical properties existing in the atomic nuclei of chemical substances, good examples being the protons or hydrogen nuclei in water and various hydrocarbons. The pertinent mechanical property possessed by such a nucleus is that of spin at a characteristic frequency about its own central axis, and as the nucleus has mass, it possesses angular momentum of spin and accordingly comprises a gyroscope, infinitely small, but nevertheless having the normal mechanical properties of this type of device. In addition, the nucleus possesses a magnetic moment directed along its gyroscope axis. Thus each nucleus may be visualized as a minute bar magnet spinning on its longitudinal axis. For a given chemical substance, a fixed ratio exists between the magnetic moment of each nucleus and its angular momentum of spin. This ratio is known as the gyro-magnetic ratio, and is normally designated by the Greek letter $\gamma$.

A small sample of chemical substance, such as water as previously noted, obviously contains a vast number of such gyroscopic nuclei. If the sample is placed in a strong uni-directional magnetic field these spinning nuclei align themselves with their magnetic axes parallel to the field, after the manner of a large gyroscope standing erect in the earth's gravitational field. In the aggregate, whether the various nuclear magnetic moments are aligned with or against the field is determined largely by chance, but while a large number aligned in opposite directions cancel each other, there always exists a net preponderance in one direction which for analysis may be assumed as with the field. Thus the sample, affected by the magnetic field, acquires a net magnetic moment $M_0$ and a net angular moment $I_0$, which two quantities may be represented as the vector sums of the magnetic moments and spins of all the nuclei concerned.

So long as the sample remains undisturbed in the field, the gyroscopic nuclei remain in parallel alignment therewith as noted. If however, a force is applied which tips the spinning nuclei out of alignment with the main field, upon release of the displacing force the spinning nuclei, urged again toward realignment by the force of the field, rotate or precess about the field direction in the familiar gyroscopic manner. Precession occurs with a radian frequency $\omega_0 = \gamma H_0$, where $H_0$ is the field strength affecting each nucleus and $\gamma$ is the previously noted gyromagnetic ratio. This precessional frequency is termed the Larmor frequency, and since for any given type of nuclei $\gamma$ is a constant (for example $2.68 \times 10^4$ for protons or hydrogen nuclei in water), it is evident that the Larmor frequency of each precessing nucleus is a direct function of the field strength affecting that particular nucleus. It will further be evident that if the field strength $H_0$ is of differing values in different parts of the sample, the groups of nuclei of these various parts will exhibit net magnetic moments precessing at differing Larmor frequencies, and thus become angularly divergent.

It is upon the above described characteristic of differential precession in an inhomogeneous field that the technique of spin-echoes is based. For clarity in the following general explanation, it is first appropriate to describe briefly an example of suitable apparatus for producing the effects, such apparatus being shown diagrammatically in Figures 1 and 2. Referring first to Figure 1, the numeral 30 designates a sample of chemical substance, for example water or glycerine, in which information is to be stored. The sample 30 is disposed between the pole faces of a magnet 31, preferably of the permanent horn type, but which of course if desired may be instead the electro-magnetic equivalent. The main magnetic field $H_0$ exists in the vertical direction, while a radio-frequency coil 32 is arranged to supply a field perpendicular to the $H_0$ field, for applying tipping force to the spinning nuclei as noted. A pair of direct current coils 33 and 34, arranged as shown diagrammatically with respect to the magnet 31 and R. F. coil 32, may be provided to regulate the inhomogeneity of the field $H_0$, as explained at length in United States Patent No. 2,700,147 to G. L. Tucker.

Figure 2 illustrates by semi-block diagram a typical electrical arrangement by which the impulses may be stored and echoes recovered from the sample 30. Inasmuch as the internal structures and modes of operation of the labelled block components are in general well known in the electronic art, description thereof will appropriately be limited to that necessary to explain the manner in which or with what modification they play their parts in carrying out the present invention.

A synchronizer or pulse generator 35 originates information and recollection pulses and other control pulses required by the system. The exciter unit 36, controllable by the pulse source 35 and comprising primarily an oscillator and a plurality of frequency doubling stages, serves as a driving unit for the R. F. power amplifier 37. In the production of a pulse the source 35 first energizes the exciter 36 to place an R. F. driving signal on the amplifier 37, then "keys" the amplifier to produce an output signal therefrom. This output is routed via a tuning network 38 to a coil 39 which is inductively coupled to a second coil 40 adapted to supply energy to a bridge circuit network 41. One leg of the bridge circuit comprises the previously described R. F. coil 32, Fig. 1, while a second R. F. coil 42, identical with coil 32, forms the second or balancing leg. A signal amplifier or receiver 43 has its input conductor 44 connected to the network 41 between the coils 32 and 42. The output 45 of the amplifier 43 is directed to suitable apparatus for utilization of the echo pulses, such apparatus being illustrated herein by an oscilloscope 46 provided with a horizontal sweep control connection 47 with the synchronizer 35.

The sample 30 is retained within the R. F. coil as indicated. From the balanced bridge arrangement shown, it will be evident that R. F. pulses introduced via the coil 40 energize the coils 32 and 42 equally, so that while the sample 30 receives the desired input pulses, the centrally connected conductor 44 carries but little R. F. power to the amplifier 43. By this means, the sample 30 may be subjected to heavy R. F. power pulses without unduly affecting the signal amplifier. However, echo pulses induced by the sample 30 affect only the coil 32, so that by unbalance of the bridge such pulses are applied to the amplifier 43 as desired.

A D. C. current source 48, controllable by the synchronizer 35, is adapted to supply current to the coils 33 and 34 for field inhomogeneity regulation as previously noted.

To initiate echo formation, the sample is subjected to a powerful R. F. pulse, termed the "recollection" pulse, which in effect changes the divergence of the constituent moments to convergence. With maintenance of proper time and field condition relationship, the rotating moments eventually return to coincidence, at which point they reinforce each other to induce a signal in the R. F. coil 32, this signal being the "echo" of the "entry" R. F. pulse which initiated the sequence. The signal is transmitted to the amplifier 43, amplified, and directed to the oscilloscope 46 or other device for utilization.

The above description, as noted, set forth for illustration the simple case of a single echo, in which case the maximum echo signal would normally be produced by applying an "entry" pulse sufficient to tip the moment group through 90°, i. e., completely into the XY plane. Lesser angles of tip also produce useful moment groupings, so that by applying successive entry pulses of proper duration and amplitude, a plurality of entries may similarly be made to produce a corresponding train of echoes. However, in this and all other variations of the process as hereinafter set forth, it will be understood that the basis of echo production is the same, namely the systematic disassembly and subsequent systematic reassembly of related moments of spinning particles in a suitable field.

In practice, there are two important types of procedure in spin-echo formation, namely the "mirror echo" process and the "stimulated echo" process, illustrated in comparison in Figure 5. In this figure the ordinate represents the voltage across the terminals of the R. F. coil 32 containing the sample, while the abscissa represents time. In order to make illustration feasible, the echo pulses have been drawn $10^5$ times larger than they would be on a scale of the ordinate suitable for drawing the storage and recollection pulses. The duration of each storage pulse may be of the order of a few microseconds, whereas the times $\tau$, which are the "memory" or "storage" intervals, are of course much greater, being variable in maximum extent according to the type of sample employed.

The difference in storage methods for "mirror" and "stimulated" echo production, which is a fundamental distinction, has been set forth in detail in the previously mentioned scientific publication and therefore need be reviewed only in pertinent relation to the present invention. In mirror storage as illustrated, the entry pulses, applied to the nuclei as previously explained, precede the recollection pulse in their chosen order, while the echoes follow the recollection pulse in reverse order. Thus it will be seen that the echo and storage pulses have "mirror" symmetry with respect to the center of the recollection pulse, hence the characteristic name for this type of echo procedure.

In the case of the stimulated echo process, as shown in the diagram, an R. F. "pre-pulse" $P_p$ is first applied to the sample. This pre-pulse is of sufficient amplitude and duration to tip all the nuclear moments of the sample substantially through 90 degrees, i. e., into the XY plane, where during a time interval $\tau_1$, they are permitted to spread and distribute themselves throughout the plane by differential Larmor precession as previously explained. Following the time interval $\tau_1$, the storage pulses are applied, these pulses having the effect of depositing groups or "families" of moment vectors on a system of cones revolving about the Z-axis or direction of the field $H_0$, i. e., the pulses may be described as entered into "Z-axis storage."

The recollection pulse $P_r$ is of proper duration and amplitude to tip the revolving moment cones again into the XY plane, at the same time having the effect of reversing the relative angular motions among the constituents of each moment group. Thereupon the constituents of the respective groups re-assemble to induce echo pulses in the coil 32, these pulses starting at the end of a second time period $\tau_1$ after the recollection pulse and appearing in the same order as their corresponding entry pulses. Thus the figure for the stimulated echo process will be seen to have "translational" symmetry in the relation of the entry pulses to the pre-pulse and the echoes to the recollection pulse.

In order to set forth most clearly the distinctive formation of mirror type and stimulated echoes, these phenomena necessarily have been described separately in their idealized or pure state, that is, as though each type of echo process were carried out without any presence of the other, and as though each information pulse and its echo were an externally unaffected combination. However, since as previously pointed out, the actual physical phenomena involve the inter-relationships among countless spinning nuclei, the effects described comprise what may be termed the dominant resultant manifestations, but are by no means the only effects present. In practice, with multiple information pulse entry and echo formation, a limitation on the practical number of pulses may be set by the production of spurious echoes due to inter-pulse effects which raise the "noise level" of the system and affect the amplitude of the desired echo pulses. These inter-pulse effects are largely a result of the action of each information pulse after the first upon the pulses which preceded it.

When information entries are supplied to the device as a train of pulses, each information pulse after the first tends to act also as a semi-recollection pulse and generate echoes. If many such inter-pulse echoes occur simultaneously with some desired echo, the effective amplitude of the net voltage signal is greatly reduced from that which would result from the desired echo alone. This is particularly the case for equal pulse spacing in the information train, and is illustrated in Figure 6, in which it is desired to produce mirror echoes 7, 6, 5, 4, 3, 2 and 1 from corresponding information pulses 1, 2, 3, 4, 5, 6, and 7. The presence of inter-pulse echoes is shown at $a$, $b$, $c$, and $d$, etc.

Such spurious echoes fall generally into three categories. Class I arises as a result of partial read-out by the recollection pulse of the Z-axis storage caused by each information pulse acting on each previous pulse. The strength of each such stored element is proportional to $\sin_2 \theta_i$, where $\theta_i$ is the angle of tip caused by the information pulse. This read-out appears, as shown, as a set of stimulated echoes $a$, $b$, etc. following the recollection pulse, each at an interval determined by the spacing between the two causitive pulses.

For example, with pulse spacing $\delta$ and $t_r$ the time of the recollection pulse, at time $(t_r+\delta)$ there will be a composite echo caused by these pairs 1—2, 2—3, 3—4, etc.; with N pulses there will be $(N-1)$ of these pairs. With constant frequency in the R. F. input these spurious echoes add, and if the recollection pulse causes a nutation of $\theta_r$, the resultant spurious echo at $(t_r+\delta)$ is proportional to $(N-I) \sin^2 \theta_i \sin \theta_r$. Similarly it follows that the spurious signal at $(t_r+k\delta)$ will be proportional to $(N-k) \sin^2 \theta_i \sin \theta_r$, where $K \leq N$. Hence these echoes decrease with time and vanish at $(t_r+k\delta)$. However, it will be evident that if the information pulse train occupies more than half the total time interval between the first pulse and the recollection pulse, the above described class I spurious echoes intrude into the desired echo interval and cause interference.

Second and third classes of spurious echoes arise from substantially the same cause described above, i. e., a stimulated inter-pulse echo is produced by every combination of three information pulses and has a strength proportional to $\sin^3 \theta_i$. These stimulated echoes are then "flipped throughout 180° by the recollection pulse; this causes a mirror echo of the inter-pulse stimulated echoes (class II), and also results in a further following set of echoes, class III, which is in effect a repetition of the class II inter-pulse train. Interpulse echoes whose amplitudes are proportional to higher powers of $\sin \theta_i$ may also be included, but as the above analysis is sufficient to explain the observed effects, such further complication in derivation is unnecesary.

It thus will be seen that the intrusion of inter-pulse echoes produces undesirable effects as previously noted, not only by producing unwanted echoes themselves but also by reducing the amplitude and uniformity of the desired echoes, as illustrated in simplified form in Fig. 6; in other words, the signal to noise ratio of the system is reduced. Without unnecessary similar description, it will be evident that inter-pulse echoes also arise in the production of desired stimulated echoes, with similarly disadvantageous results.

The foregoing description has shown that the bad effects of interpulse echo formations are largely the result of their cumulative nature, which additive characteristic is due to the fact that they form in phase when the R. F. input frequency is constant. It follows that if this phase coincidence can be erased, the effective formation and particularly the accumulation of spurious echoes will be eliminated or greatly reduced. The present invention accomplishes this result by changing the frequency of the R. F. input during the period in which the information pulses are entered, i. e., by frequency modulation. Provision for such modulation may be made in the exciter 36 by an arrangement such as that shown in Fig. 3, which illustrates the internal circuits of the exciter. Referring to Fig. 3, it will be seen, as previously mentioned, that this unit includes an oscillator 49 and successive frequency-doubling stages 50, 51 and 52, the last feeding a buffer amplifier 53 having an output conductor 54 leading to the power amplifier 37, Fig. 2.

The oscillator 49 is provided with an on-off switching tube 55 having a control-grid connection via a condenser 56 to the gating conductor 57 leading from the synchronizer 35, Fig. 2. The gating conductor 57 is also connected via a resistor 58, a conductor 59, a potentiometer 60, a second resistor 61, and a condenser 62, with the control grid of a reactance tube 63. From the conductor 59 a branch 64 runs to one side of a condenser 65, the latter being connected on the other side to ground as shown.

The plate of the reactance tube 63 is connected through a condenser 66 into the tank circuit 67 of the oscillator 49, this tank circuit being illustrated as of the Clapp type including an inductance 68, main condensers 69 and 70, and the parallel adjusting condenser combination 71, 72. The reactance tube combination is tuned to the basic oscillator frequency, herein illustrated as 4 mc. In action, the R. F. plate current delivered to the tube 63 by the tank circuit 67 leads the latter's voltage by approximately 90 degrees, giving the effect of a capacitance which forms part of the tank circuit. It will thus be evident that any change in this leading current will change the effective capacitance of the tank and result in a change in the oscillator frequency, increasing current raising the frequency and decreasing current lowering it.

The above effect is employed in the spin-echo sequence in the following manner, assuming the oscillator 49 initially to be quiescent.

Referring to Fig. 7, $T_0$ represents a time prior to the time $T_1$ at which the first information pulse is to be applied, while $T_2$ indicates a time point at or immediately following the termination of recollection pulse $P_r$. At time $T_0$ the synchronizer 35 initiates a negative square wave of voltage on the gating conductor 57, this wave encompassing the time $T_0$ to $T_2$ and terminating at the latter point. Figure 4 illustrates such a wave applying at point A, the voltage drop being shown typically as 40 volts.

Responsive to the lowered voltage, the right side of the switch tube 55 operates as an inverter to actuate the left side, which latter acts through its illustrated cathode follower connection to the screen grid of the oscillator tube to place the oscillator 49 in operation.

Referring again to Fig. 4, which shows typical values of the resistor 58 and the condenser 65, it will be seen that the combination of these components in effect integrates the applied square wave, producing at point B between them an approximate uniformly falling voltage extending to time $T_2$, the total drop as illustrated for a typical time interval of 3 milliseconds being approximately 8 volts. A portion of this voltage gradient, determined by the potentiometer 60, is applied to the grid of the reactance tube 63, causing the latter's leading R. F. plate current fed by the oscillator tank 67 to gradually decrease, with resultant gradual decrease in the oscillator's frequency as previously described. This decrease is multiplied through the frequency doublers and transmitted through the buffer amplifier 53 to the power amplifier 37, Fig. 2, so that the latter is supplied with a constantly changing radio frequency throughout the time period $T_0$ to $T_2$. At time $T_2$ the oscillator is turned off by termination of the square wave from the synchronizer. During the following quiescent period, which includes the echo period and the "recovery" or re-polarizing time of the sample 30, the voltage at point B and consequently the grid condition of the reactance tube 63 gradually rise again to normal.

At and following time $T_1$, Fig. 7, the R. F. information pulses $P_i$ are applied, their entry being made with the above described progressive change in frequency of the R. F. supply. As a result, the combinations of incipient interpulse echoes which would otherwise destroy or cut down the desired echoes are made to add with such differences in relative phase as to render their sum substantially negligible, thus making possible the clean and uniform echo train shown in Figure 7 with greatly reduced "noise level."

The actual rate of frequency change required is quite small relative to the total frequency itself. For example, a constant rate of change of at most 4 kilocycles per millisecond has been determined to be sufficient to produce the improvement shown in Fig. 7 over the condition of Fig. 6. If under any conditions some minor vestigial inter-pulse echo effects remain, these may be removed by application of one or more "discriminator" pulses of field inhomogeneity as set forth in co-pending application Serial No. 443,216, filed July 14, 1954, now Patent No. 2,714,714, dated August 2, 1955, but particularly in view of the fact that other functions in spin echo practice make use of field manipulations of various types, it will be obvious that one of the advantages of the present method lies in the substantial elimination or marked reduction in requirement for such preventive pulses.

As an alternative to the described modulation of the R. F. frequency itself, the anti-coherence effect may be attained with uniform R. F. frequency by interrupting the R. F. generation between information pulses, starting the oscillations for each information pulse at the same point on the R. F. curve, establishing the timing relationship:

$$NT_{pp} \neq CT_f$$

where $T_{pp}$ is the inter-pulse timing in the information train, $T_f$ is the period of the R. F. oscillation, C is an integer and N is the number of information pulses within critical range of each other, that is closely enough situated that with coherence they would normally inter-act to set up significant spurious echoes. With relatively short echo trains, N may encompass all the pulses of the train, while with long trains the critical range may number less than the total number of pulses. In any case, the above expression provides that the inter-pulse frequency and the R. F. oscillation frequency be incommensurate, so that effective in-phase addition of spurious echo effects is prevented.

To achieve the desired result with R. F. input of constant frequency, the unit 37 may be constructed to comprise a self-excited oscillator, eliminating the separate exciter 36. In this case the R. F. oscillations are turned on and off for each information pulse and for the recollection pulse, the frequency of the control pulses furnished by the source 35 for information pulse entry being set at a value establishing the above noted incommensurate relation with the R. F. frequency. For some types of service other variations may be employed to the same end, such as modulation of the information pulse frequency. Noise modulation (random modulation) of the interpulse spacing is a simple and effective method. The amplitude of pulse spacing modulation should be at least as large as the period of the R. F. wave (in a typical case .03 micro-second), and the noise should contain significant components of frequency as high as the information pulse frequency.

From the foregoing description it will be evident that the alternative processes set forth are all detail variations of the same primary method, namely the establishment of R. F. phase anti-coherence during information entry for inhibiting significant inter-pulse effects. While the invention has been explained in preferred form, it is not limited to the precise embodiments illustrated, as obviously various modifications may be made without departing from the scope of the appended claims.

We claim:

1. In spin echo apparatus for entry of information in a sample of chemical substance and subsequent extraction of said information by controlled differential Larmor precession of moments of gyroscopic particles of said substance in a polarizing field, in combination, timing means to establish an operating sequence including a storage period and an extraction period, means controllable by said timing means to furnish torsional informational pulses of radio-frequency oscillations to said particles during said storage period and a torsional recollection pulse to said particles at the termination of said storage period, whereby said particles may precess to coincidence to form main echo signals corresponding to said information pulses in said extraction period, means to vary the time relationships of said furnished radio-frequency oscillations to said information pulses composed thereof, whereby phase anti-coherence may be established among the radio-frequency contents of incipient inter-pulse echo effects arising among said information pulses, and means to detect said main echo signals.

2. In spin-echo apparatus for entry of information in a sample of chemical substance and subsequent extraction of said information by controlled differential Larmor precession of moments of gyroscopic particles of said substance in a polarizing field, in combination, timing means to establish an operational sequence including a storage period and an extraction period, means controllable by said timing means to furnish torsional information pulses of radio-frequency to said particles during said storage period and a torsional recollection pulse to said particles at the termination of said storage period, whereby said moments may precess to coincidence to form echo pulses corresponding to said information pulses in said extraction period, means to maintain a progressive change in rate of said radio-frequency throughout said storage period, and means to detect said echo pulses.

3. The combination claimed in claim 2 wherein said radio-frequency furnishing means includes an oscillator having a tank circuit, and wherein said frequency changing means includes means to effect continuous modulation of the effective reactance of said tank circuit.

4. The combination claimed in claim 2 wherein said radio-frequency furnishing means includes an oscillator having a tank circuit and means controllable by said timing means to actuate said oscillator throughout said storage period, and wherein said frequency changing means includes means controllable by said timing means to vary the effective reactance of said tank circuit.

5. The combination claimed in claim 2 wherein said radio-frequency furnishing means includes an oscillator adapted to be actuated by said timing means and having a tank circuit, and wherein said frequency changing means includes a reactance tube controllable by said timing means to draw a leading current of progressively changing magnitude from said tank circuit throughout said storage period.

6. The combination claimed in claim 2 wherein said radio-frequency furnishing means includes an oscillator controllable by said timing means and having a tank circuit, and wherein said frequency changing means includes means controllable by said timing means to draw a leading current of progressively decreasing magnitude from said tank circuit throughout said storage period.

7. The combination claimed in claim 2 wherein said radio-frequency furnishing means includes an oscillator controllable by a square wave of voltage from said timing means, including means to educe a tapering wave of voltage from said square wave, and wherein said frequency changing means includes means controlled by said tapering voltage to draw a leading current of tapering magnitude from said tank circuit.

References Cited in the file of this patent

UNITED STATES PATENTS

| | | |
|---|---|---|
| 2,714,714 | Anderson | Aug. 2, 1955 |
| 2,718,629 | Anderson | Sept. 20, 1955 |